No. 851,688. PATENTED APR. 30, 1907.
J. T. McKINNON.
SIPHONING DEVICE.
APPLICATION FILED SEPT. 17, 1906.
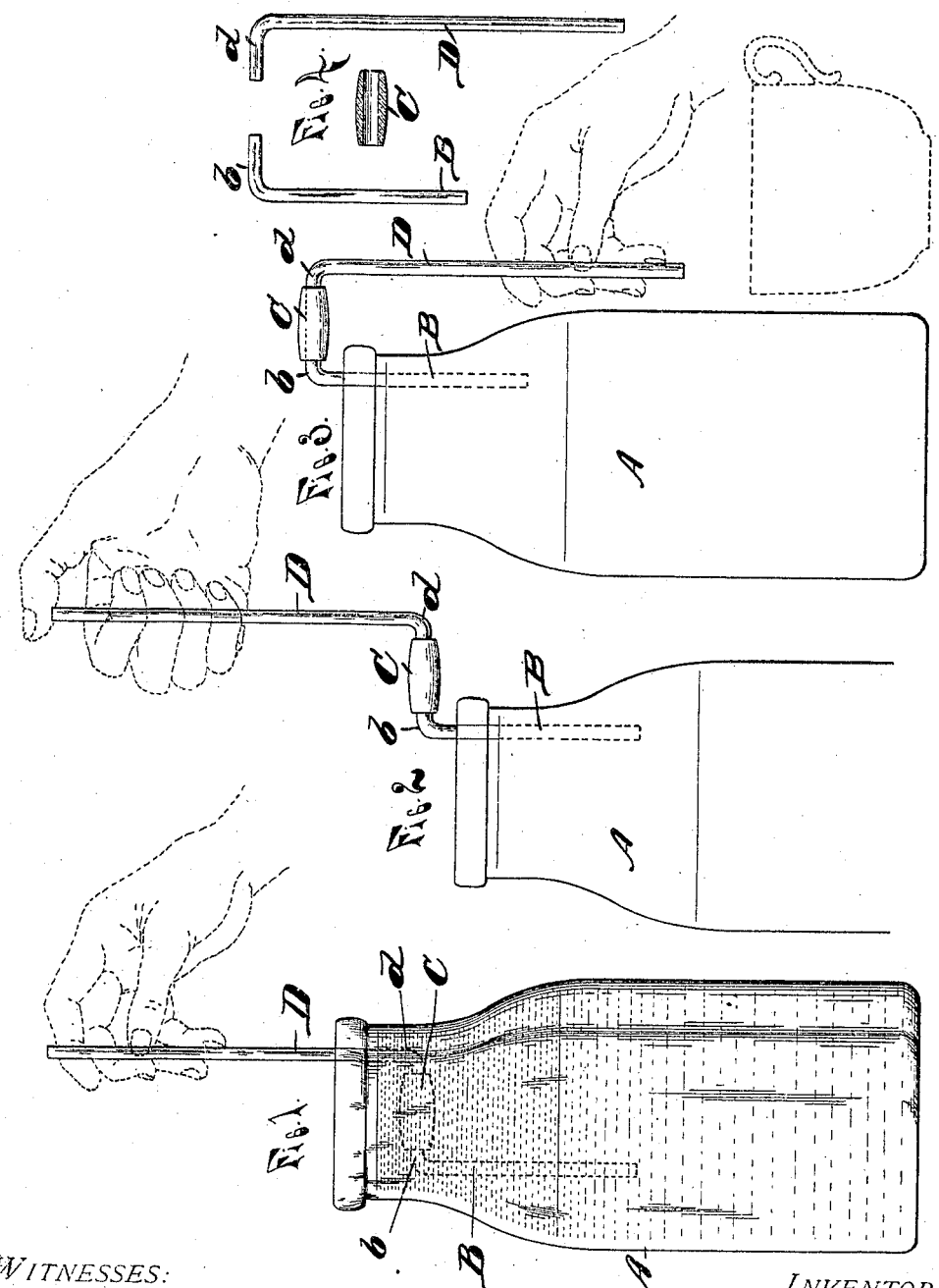
WITNESSES:
INVENTOR
James T. McKinnon
BY
Attorney

UNITED STATES PATENT OFFICE.

JAMES T. McKINNON, OF DETROIT, MICHIGAN.

SIPHONING DEVICE.

No. 851,688.      Specification of Letters Patent.      Patented April 30, 1907.

Application filed September 17, 1906. Serial No. 334,886.

*To all whom it may concern:*

Be it known that I, JAMES T. McKINNON, a citizen of the United States, residing at Detroit, county of Wayne, State of Michigan, have invented a certain new and useful Improvement in Siphoning Devices; and I declare the following to be a full, clear, and exact description of the same, such as will enable others skilled in the art to which it pertains to make and use the same, reference being had to the accompanying drawings, which form a part of this specification.

My invention relates to an improvement in siphoning devices for use in drawing off cream from the top of milk, shown in the accompanying drawings, and more particularly set forth in the following specification and claims.

In the drawings: Figure 1 is a side elevation of a bottle, showing the siphoning device in the act of being forced into the body of the cream below the return bend of the siphon; Fig. 2 is a similar view showing the siphon raised, the long leg of the siphon being sealed by placing the thumb over the end of the tube; Fig. 3 shows the siphon with its long leg turned down in the act of extracting the cream from off the milk; Fig. 4 shows the several parts constituting the siphon, the connecting thimble being shown in section.

The object of this invention is to provide a device by means of which the cream that forms on top of bottled milk as it is usually delivered in cities may be extracted without agitating the cream or causing it to mix with the milk;—the construction being such that the several parts constituting the device may be readily separated and cleansed.

Referring to the letters of reference shown in the drawings, A is the milk bottle, B the short leg of the siphon provided with a right angle bend $b$ designed to fit into the thimble C, which is preferably made of rubber.

D is the long leg of the device also provided with a bent portion $d$ designed to enter the thimble C.

The operation of the device will be readily understood from the drawings. To start the siphon, it is first thrust into the cream until the cream rises above the return bend or thimble C. The finger of the operator is then placed on the end of the long leg of the siphon, as indicated in Fig. 2, and the leg rotated in the thimble until it projects downward as indicated in Fig. 3. The siphon is then supported in the cream until it is all drawn from the top of the milk.

Having thus described my invention, what I claim is:—

1. A siphoning device composed of a short, rigid nipple, and rigid short and long tubes detachably and rotatably connected with opposite ends of the nipple, the body portion of each tube lying at a right angle to the nipple.

2. A siphoning device consisting of a long and a short tube having ends bent at right angles, a sleeve providing a swivel connection between the tubes, whereby to start the siphon the short leg of the siphon together with its swivel connection with the long leg can be immersed in the fluid to be decanted and while the shorter leg only is immersed the long leg may be turned downwardly with respect to the short leg, substantially as described.

3. The combination with a milk jar; of a siphoning device consisting of a long and a short tube having ends bent at right angles, a sleeve providing a swivel connection between the two, whereby to start the siphon the shorter leg of the siphon and the swivel connection together with a portion of the longer tube may be immersed in the milk to be decanted, and while the shorter leg only is immersed, the longer leg may be turned downwardly with respect to the jar.

In testimony whereof, I sign this specification in the presence of two witnesses.

JAMES T. McKINNON.

Witnesses:
     S. E. THOMAS,
     HENRY E. VILLEROT.